Figure 3:
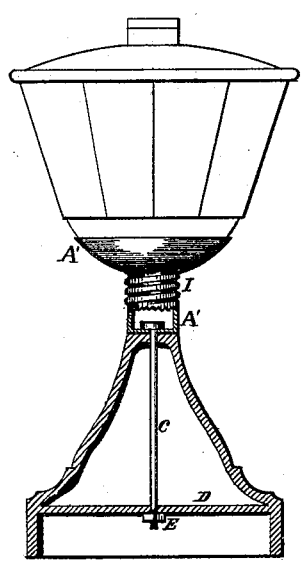

2 Sheets—Sheet 1.
A. FRENCH.
LAMP.
No. 171,608. Patented Dec. 28, 1875.
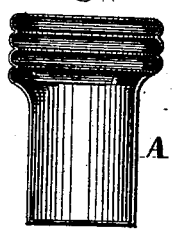
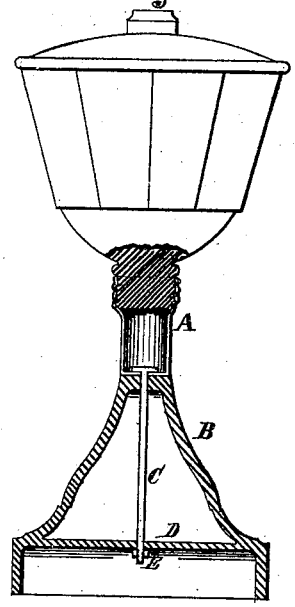
Witnesses.
Chas. W. Morgan
J. Elliott Shaw
Inventor.
Alonzo French
By Isaac R. Oakford
His Attorney 2 Sheets—Sheet 2.

A. FRENCH.
LAMP.

No. 171,608.

Patented Dec. 28, 1875.

WITNESSES.
Alex. M. Morgan
Jos. W. Swain

INVENTOR.
Alonzo French
By Isaac R. Oakford,
His Attorney

UNITED STATES PATENT OFFICE.

ALONZO FRENCH, OF PHILADELPHIA, PENNSYLVANIA.

IMPROVEMENT IN LAMPS.

Specification forming part of Letters Patent No. 171,608, dated December 28, 1875; application filed September 23, 1875.

*To all whom it may concern:*

Be it known that I, ALONZO FRENCH, of the city and county of Philadelphia, State of Pennsylvania, have invented a new and useful improvement in socket or column for connecting fountains of lamps, or other glass vessels, to stands, bases, supports, &c., of which the following is a specification:

My invention consists in connecting glass vessels, such as fountains of lamps, inkstands, &c., with a metal base or stand by means of a socket provided on one portion of its length with screw-threads, and attached to the base by means of a bolt and nut, the object of which is to produce a cheap and effectual connection for such vessels. My invention further consists in making the upper end of the socket of a curved or dish shape, in order to embrace and lend additional support to the lower part of the vessel, and also to improve the appearance of the article.

Figure 1 is a vertical section of my improvement in socket or column for connecting a glass vessel to a base or stand. Fig. 2 is a vertical section through a glass vessel and a metal base or stand, showing the parts connected by means of my invention.

The socket or column A, Fig. 1, is enlarged at the upper end, and furnished with internal screw-threads, to accommodate the circular projection or stem formed on the lower side of glass founts or vessels. The lower end of said socket or column is closed, and is provided with a small opening, through which a screw or bolt is passed for securing it to a metal base of any suitable form, as shown in Fig. 2. The lower end of the socket or column rests directly upon the upper end of the base B, and the bolt C, which secures it in position, passes down through the center of the base, and through a cross-bar, D, at the lower part thereof. A screw-nut, E, on the lower end of the rod retains the parts together. The column or socket A may also be made of a uniform diameter throughout its length, dispensing with the enlargement at the upper end, and may be attached to the base B by means of a bolt and nut, as heretofore mentioned. The upper part of the socket A' is made concave or dish-shaped, to encompass the lower part of the glass vessel H, and has the screw-threads I, for attaching the vessel, located between the upper and lower ends.

In a former application I have shown and described the upper part of the column as concaved or dished. In that instance the edges of the metal are turned outward, and a small space intervenes between the glass and the inside of the metal, to serve solely as a drip-cup; whereas in the present case the metal is made to fit closely around the glass, to serve as an ornament and additional support to the vessel.

I am aware that a patent was granted to J. S. and T. B. Atterbury, September 29, 1868, for a screw-socket with both ends open and the screw-thread extending the full length, for uniting a glass bowl to a glass stand; but I do not wish to claim this screw-socket, or uniting glass to glass; but I do claim that by connecting the glass vessel to a metal base by means of a socket or column constructed as described a greater advantage is secured, inasmuch as iron or metal bases or stands for lamps and other glass vessels are coming into more general use, owing to the fact that metal is more durable, and less liable to break in handling or when packed for transportation.

What I claim as my invention is—

1. The socket A, provided with screw-threads at the upper end, in combination with the bolt C, nut E, and cross-bar D, for uniting a glass vessel to a metal base or stand, substantially as shown and described.

2. The socket A', concave or dish-shaped at the upper end, and provided with screw-threads I between the ends, in combination with the bolt C, nut E, and cross-bar D, for uniting a glass vessel to a metal base or stand, substantially as shown and described.

ALONZO FRENCH.

Witnesses:
ISAAC R. OAKFORD,
ALEXANDER H. MORGAN.